United States Patent
Coe

(10) Patent No.: US 7,714,035 B1
(45) Date of Patent: May 11, 2010

(54) PLUMBING MANIFOLDS

(75) Inventor: Tom Coe, Knoxville, TN (US)

(73) Assignee: NIBCO, Inc., Elkhart, IN (US)

( * ) Notice: Subject to any disclaimer, the term of this patent is extended or adjusted under 35 U.S.C. 154(b) by 402 days.

(21) Appl. No.: 11/481,222

(22) Filed: Jul. 5, 2006

(51) Int. Cl.
C08F 2/42 (2006.01)
F16L 39/00 (2006.01)
F16L 39/06 (2006.01)
C08J 3/28 (2006.01)
F16L 39/02 (2006.01)

(52) U.S. Cl. .............. 522/161; 522/150; 522/157; 522/912; 522/184; 522/189; 264/488; 264/496; 264/484; 428/34.1; 428/35.7; 428/36.8; 428/36.9; 428/36.92; 428/188; 285/125.1; 285/422; 285/423; 285/354; 138/109; 138/123; 138/125; 138/137; 138/140; 138/141

(58) Field of Classification Search ........... 264/488, 264/496, 494; 522/150, 157, 161, 912, 184, 522/189; 428/188, 34.1, 35.7, 36.8, 36.9, 428/36.92; 285/125.1, 422, 354; 138/125, 138/123, 137, 109, 140, 141
See application file for complete search history.

(56) References Cited

U.S. PATENT DOCUMENTS

| | | | | | |
|---|---|---|---|---|---|
| 3,779,068 | A | * | 12/1973 | Forsythe ............... 73/49.1 |
| 3,791,679 | A | * | 2/1974 | Glover ............... 285/132.1 |
| 4,238,131 | A | * | 12/1980 | Cleveland ............... 285/38 |
| 4,343,864 | A | * | 8/1982 | Berejka ............... 428/500 |
| 4,361,212 | A | * | 11/1982 | Bolang et al. ............... 188/377 |
| 4,524,807 | A | * | 6/1985 | Toliusis ............... 137/884 |
| 4,954,299 | A | * | 9/1990 | Greig et al. ............... 264/488 |
| 5,279,319 | A | * | 1/1994 | Fidelman ............... 137/14 |
| 5,852,143 | A | * | 12/1998 | Sishta et al. ............... 526/127 |
| 5,868,439 | A | * | 2/1999 | Schmidt ............... 285/127.2 |
| 6,089,263 | A | * | 7/2000 | Dumser ............... 137/552 |
| 6,114,486 | A | * | 9/2000 | Rowland et al. ............... 526/352 |
| 6,325,959 | B1 | * | 12/2001 | Ek et al. ............... 264/209.5 |
| 6,578,605 | B2 | * | 6/2003 | Cooper et al. ............... 137/625.5 |
| 6,672,324 | B2 | * | 1/2004 | Jarvenkyla ............... 137/15.01 |
| 6,736,165 | B2 | * | 5/2004 | Bender ............... 137/883 |
| 6,907,905 | B2 | * | 6/2005 | Lumello ............... 137/883 |
| 7,007,716 | B2 | * | 3/2006 | Smahl et al. ............... 137/561 A |
| 2002/0007861 | A1 | * | 1/2002 | Hansen et al. ............... 138/143 |
| 2002/0047265 | A1 | * | 4/2002 | Karhu et al. ............... 285/125.1 |
| 2004/0132854 | A1 | * | 7/2004 | Du Plessis et al. ............... 522/114 |
| 2006/0275572 | A1 | * | 12/2006 | Bonnet et al. ............... 428/36.91 |
| 2009/0246433 | A1 | * | 10/2009 | Michie et al. ............... 428/36.9 |

FOREIGN PATENT DOCUMENTS

WO WO9828135 A * 7/1998
WO WO 2004/072168 * 8/2004

OTHER PUBLICATIONS

Shafir and Arnold, "Ferrocene-Based Olefin Polymerization Catalysts: Activation, Structure, and Intermediates", Organometallics 2003, 22, 567-575.*
Polyethylene—Wikipedia, the free encyclopedia. retrieved online, on Feb. 16, 2008 from URL<:http://en.wikipedia.org/wiki/polyethylene>.*

* cited by examiner

*Primary Examiner*—Sanza L McClendon
(74) *Attorney, Agent, or Firm*—Price, Heneveld, Cooper, DeWitt & Litton, LLP

(57) ABSTRACT

There is provided a method for preparing a plumbing manifold for use in a water system in which the manifold after molding is subjected to cross-linking high energy radiation. The manifold is made by polyethylene or a metallocene polyethylene.

11 Claims, 1 Drawing Sheet

PLUMBING MANIFOLDS

FIELD OF THE INVENTION

The invention relates to manifold plumbing systems that are controls for hot and cold water feeds which are cross-linked by a cross-linking high energy electron beam. More particularly, there is provided plumbing manifolds comprising cross-linked polyethylene and cross-linked metallocene polyethylene.

BACKGROUND OF THE INVENTION

Plumbing manifolds are control centers for hot and cold water that feed supply lines to individual fixtures. Separated manifold chambers or separate manifolds can serve hot and cold water lines. The cold water manifold is fed from the main water supply line and hot water manifold is fed from the water heater. A water line dedicated to each fixture employs a port in the manifold.

Important requirements in hot and cold water domestic plumbing systems are:
1. High resistance to temperature aging for water temperatures up to 200° F.
2. High resistance to stress cracking.
3. High resistance to chemical solvents (water additives, antifreeze solutions).
4. Lowest possible linear thermal expansion.
5. High tensile strength.
6. High form stability.
7. High resistance to abrasion.
8. High resistance to deformation.
9. Dimensional tube tolerances.
10. Internal and external tube wall smoothness.
11. Behavior during long term internal pressure creep test which takes into account the temperature-dependent aging behavior of the pipe material at water temperatures up to 200° F.

To combat this premature aging the molecules within the PE are realigned in order to give greater stability to the material itself. The cross linking process takes place within the molecular structure of the plastic material. The most common thermoplastic materials currently being used for heating and plumbing pipe, often referred to as polyolefin materials are: Polyethylene (PE), Polypropylene (PP), and Polybutelene (PB) (generic term for polybutylene). Among this family of polyolefin plastics, only Polyethylene has been determined to have the molecular structure which lends itself perfectly to the cross linking process.

"Un-cross-linked" polyethylene (PE) as it is formed receives its basic dimension and wall thickness, is composed of long hydrocarbon string molecules forming a loosely held together array of hydrogen and carbon atoms which can be compared to a beaded curtain swaying in a breeze. This is basically the molecular composition of the PE which is available at hardware stores and is suitable only for non-critical applications. A material in this form is not suitable for heating and plumbing applications. Within a relatively short period of time the material fatigues under the stress of water temperature and pressure as well as temperature cycling and the beaded curtain of molecules splits open without resistance. By cross-linking the molecular "beads" (hydrocarbon string molecules) and forming cross-connections which are referred to as cross-linking bridges, the string molecules form a three dimensional network of hydrocarbon molecules. The "beaded curtain" becomes transformed into a fishing net with strength and stability.

In this way, the previously non-applicable PE is transformed, after cross-linking, into a completely different material with all the desired characteristics demanded for heating or plumbing. After the cross-linking of the PE, its molecular mobility is severely impeded by the cross-linking bridges between the string molecules. The material does not flow or melt and its form becomes stable against heat. The material holds it shape at all temperatures, even exposed to blow torch temperatures until it chars or burns. The thermoplastic has been transformed into a thermoset material by cross-linking, eliminating the melting point or liquid phase of the material.

Cross-Linking Techniques

There are basically two types of PE raw materials in use:
Low to Medium density (LD or MD PE) and High density (HD PE).

Low to Medium density polyethylene "SOFT PE" has a multi-branch string molecule shape which allows a lower to medium density formation of string molecules within the PE material.

High density polyethylene (HD PE) has a linear string molecule shape with only small slumps of branches, which allows for a higher density formation of string molecules within the PE material.

The material density affects the physical properties of the pipe material. HD PE or "HARD PE" has a higher resistance to stress cracking and chemical solvents, high tensile strength, higher resistance to deformation and is less permeable to oxygen.

Chemical cross-linking techniques include: Peroxide cross-linking, Silane cross-linking and AZO cross-linking. Three methods of peroxide cross-linking are the Engel, PAM and DAOPLAST methods. Chemical cross-linking may not be acceptable for use with drinking water.

Cross-linking is primarily used with the resin before extrusion in order to obtain uniformity in the cross-linking in the finished product.

Polyethylene made with a metallocene catalyst has specific properties. Metallocene polyethylene is stronger than low density polyethylene (LD PE) and linear low density polyethylene (LL PE) and has a higher molecular weight than polyethylene made by the Ziegler-Natta process. Preferred metallocene are the Zirconocenes, which are elastomeric thermoplastics which have a zirconium ion. Other metallocene catalysts are ferrocene (iron) and titanocene (titanium).

SUMMARY OF THE INVENTION

The invention provides an improvement in plumbing manifolds by molding a manifold by conventional methods utilizing polyethylene or metallocene polyethylene and then subjecting the resultant product to cross-linking by a high energy electron beam to form a three dimensional cross-linking network between the PE molecules.

Advantageously the formed manifold is subject to electron beam radiation of about 2 to 40 m Rads.

It is an object of the invention to provide a plumbing manifold which can be used at high pressures and temperatures.

It is a further object of the invention to provide a manifold which does not have joints that can develop leaks.

It is another object of the invention to provide a monolithic plumbing manifold.

It is another object of the invention to provide a cross-linked polyethylene manifold having greater impact resistance and tensile strength.

It is yet another object to provide a plumbing manifold which can withstand high temperatures and pressures.

It is still another object of the invention to provide a multi-outlet and inlet manifold which can be easily cut into sections.

The objects and advantages of the present invention can be better understood from a reading of the preferred embodiments and in view of the drawings wherein:

DESCRIPTION OF THE PREFERRED EMBODIMENTS

According to the present invention there is provided a polyethylene manifold for use in hot water and cold water plumbing systems having improved strength and for use in higher temperatures and pressures. More particularly, there is provided a cross-linked plumbing manifold which is prepared by subjecting a polyethylene manifold which has been molded into a monolithic structure and then subjecting the manifold to cross-linking by irradiation with a high energy electron beam of about 2 to 40 m Rads to produce a cross-linked thermoset structure.

The polyethylene can be low density polyethylene, linear low density polyethylene, high density polyethylene or metallocene polyethylene.

Figure 1:
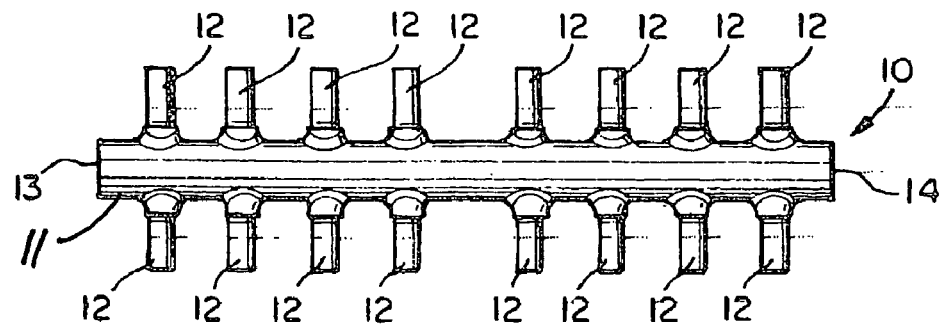
FIG. 1 is a side view of a manifold prepared by the present invention.

As shown in FIG. 1 there is a conventional style manifold having a tubular body (11) with a plurality of male portions (12) integrally formed with the tubular body (11). The end portions may be open to receive a plug or an adapter (not shown) for connection into a water system.

An advantage of the manifold (10) is that it can be easily cut in parts by cutting or sawing through the tubular body (11) to employ as many of the tubular portions (12) as required and the ends can then be fitted with a gripper, plug or other fitting as required. The manifold is irradiated by electron beam radiation before cutting.

Figure 2:
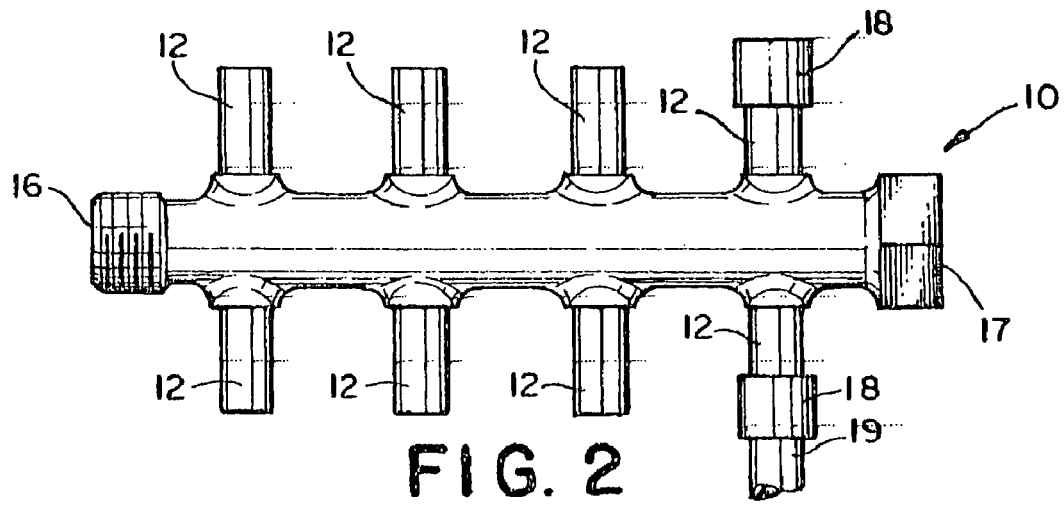
FIG. 2 is a side view of a portion of the manifold of FIG. 1 after it has been cut and fitted with parts.

FIG. 2 shows the manifold of FIG. 1 when cut into one-half and fitted with parts. The end portion (14) is fitted with an end cap (17). The cut opening (16) can be similar fitted. Tubular portions (12) can be fitted with a coupling (18) to receive tubings (19) which are connected into a water system.

Figure 3:
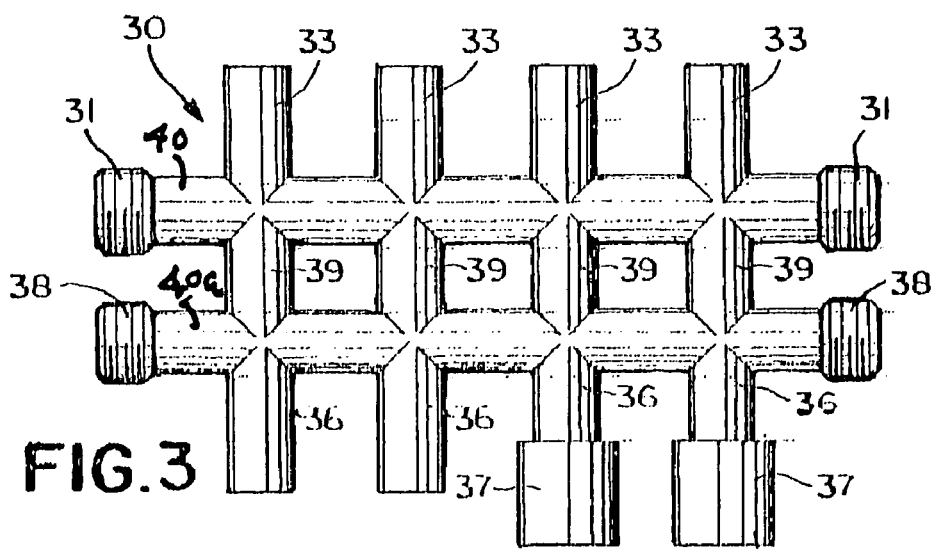
FIG. 3 is a multi outlet and inlet manifold of the invention which can be assembled in a water system.

FIG. 3 shows another manifold of the invention comprising a molded manifold (30) which consisted of a metallocene polyethylene made with a zirconium catalyst having two parallel tubular members (40, 40a) connected by tubular channels (39), tubular protrusions (33, 36). The metallocene polyethylene manifold can be used without any cross-linking and still have an improvement over polyethylene manifold in strength, stress performance and in high temperature and pressure system. Electron beam cross-linking of the metallocene manifold provides increased strength for hot and cold water systems or where increased chemical resistance is required. The manifold either before cross-linking or after cross-linking can be further modified at the ends of the tubular protrusions (33, 36) with adapters (not shown) and couplings (37) so as to connect with a tubing (as shown in FIG. 2). The parallel tubular members can have at their ends an end cap (31, 38) or any one of a coupling, in line valve or the like.

Zirconocenes generally have a dart drop impact value of >1200, a puncture force of about 10.7 lbs/mil, and a puncture energy of about 40.0 lbs/mil.

While the invention is described herein in connection with a preferred embodiment, it will be understood that it is not intended to limit the invention to that embodiment. It is intended to cover all alternatives, modifications, equivalents and variations of that embodiment and its features as may be made by those skilled in the art within the spirit and scope of the invention as defined by the appended claims.

What is claimed is:

1. In a method for producing a monolith plumbing manifold which comprises molding a polyethylene tubular body having a plurality of male tubular portions integrally formed with said tubular body that is capable of being cut into separate manifolds, the improvement which comprises subjecting the manifold to high energy electron beam crosslinking radiation and optionally providing end closure means when said tubular body is cut.

2. The process of claim 1 wherein said polyethylene tubular body is produced of polyethylene selected from the group consisting of low density polyethylene, linear low density polyethylene, and high density polyethylene.

3. The process of claim 2 wherein said polyethylene is catalyzed with a zirconocene.

4. The process of claim 2 wherein said polyethylene is catalyzed with a ferrocene.

5. The process of claim 1 wherein the manifold is irradiated at about 2 to 40 m Rads.

6. A plumbing manifold produced by the process of claim 1.

7. A plumbing manifold produced by the process of claim 3.

8. A plumbing manifold produced by the process of claim 4.

9. A plumbing manifold produced by the process of claim 5.

10. In a process for producing a polyethylene manifold in a molding process according to claim 1 the improvement which comprises that said tubular body is produced of a polyethylene catalyzed with a metallocene.

11. The process of claim 10 wherein said metallocene is a zirconocene.

* * * * *

UNITED STATES PATENT AND TRADEMARK OFFICE
CERTIFICATE OF CORRECTION

PATENT NO. : 7,714,035 B1  Page 1 of 1
APPLICATION NO. : 11/481222
DATED : May 11, 2010
INVENTOR(S) : Tom Coe It is certified that error appears in the above-identified patent and that said Letters Patent is hereby corrected as shown below:

Cover page, Abstract, line 4, "made by" should be -- made of --.

Col. 1, line 8, "is" should be -- are --.

Col. 2, line 26, "slumps" should be -- clumps --.

Col. 2, line 48, "metallocene" should be -- metallocene catalysts --.

Col. 3, line 42 , "portions may" should be -- portions (13, 14) may --.

Col. 3, line 52, "similar" should be -- similarly --.

Signed and Sealed this

Twenty-eighth Day of September, 2010

David J. Kappos
*Director of the United States Patent and Trademark Office*